United States Patent
Segev

(10) Patent No.: US 10,015,660 B2
(45) Date of Patent: Jul. 3, 2018

(54) NAN DISCOVERY WINDOW SELECTION

(71) Applicant: INTEL IP CORPORATION, Santa Clara, CA (US)

(72) Inventor: Jonathan Segev, Tel Mond (IL)

(73) Assignee: INTEL IP CORPORATION, Santa Clara, CA (US)

( * ) Notice: Subject to any disclaimer, the term of this patent is extended or adjusted under 35 U.S.C. 154(b) by 177 days.

(21) Appl. No.: 14/607,929

(22) Filed: Jan. 28, 2015

(65) Prior Publication Data

US 2016/0219422 A1    Jul. 28, 2016

(51) Int. Cl.
  *H04W 8/00*      (2009.01)
  *H04L 29/08*     (2006.01)
  *H04L 12/807*    (2013.01)
  *H04W 52/38*     (2009.01)
  *H04W 84/12*     (2009.01)

(52) U.S. Cl.
  CPC ............ *H04W 8/005* (2013.01); *H04L 47/27* (2013.01); *H04L 67/1065* (2013.01); *H04L 67/12* (2013.01); *H04W 52/383* (2013.01); *H04W 84/12* (2013.01)

(58) Field of Classification Search
  None
  See application file for complete search history.

(56) References Cited

U.S. PATENT DOCUMENTS

| 2014/0160882 A1 | 6/2014 | Vu et al. | |
| 2014/0269670 A1* | 9/2014 | Park | H04W 56/00 370/350 |
| 2016/0135122 A1* | 5/2016 | Abraham | H04W 52/02 370/311 |

OTHER PUBLICATIONS

Wi-Fi Alliance® Technical Task Group; Wi-Fi Neighbor Awareness Networking (NAN); Wi-Fi NAN Technical Specification Contribution; Version 0.0 (TG Baseline r19).

* cited by examiner

*Primary Examiner* — Kouroush Mohebbi
(74) *Attorney, Agent, or Firm* — Jason H. Vick; Sheridan Ross, PC

(57) ABSTRACT

Techniques for presenting discovery window selection in a NAN environment are provided. Specifically, methods that when taken alone or together, provide a device or group of devices with an efficient way of synchronizing and communicating with other devices is presented. The present disclosure includes a method that provides a device with the capability of locally selecting a discovery window subset that meets the current device power and application constraints. The discovery window subset is created based on a uniform distribution of discovery window selection within the set. The method describes the generation of the subsets such that set inclusion exits between any two sets.

25 Claims, 5 Drawing Sheets

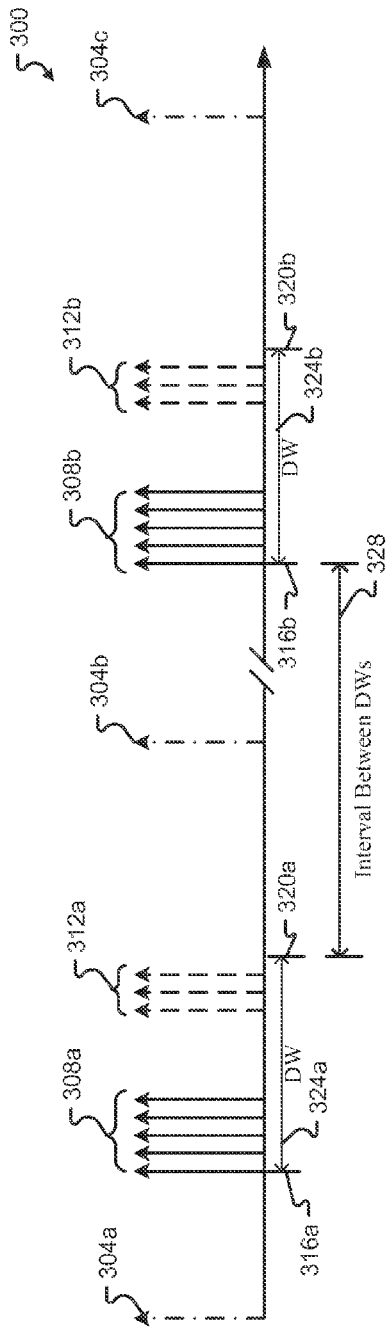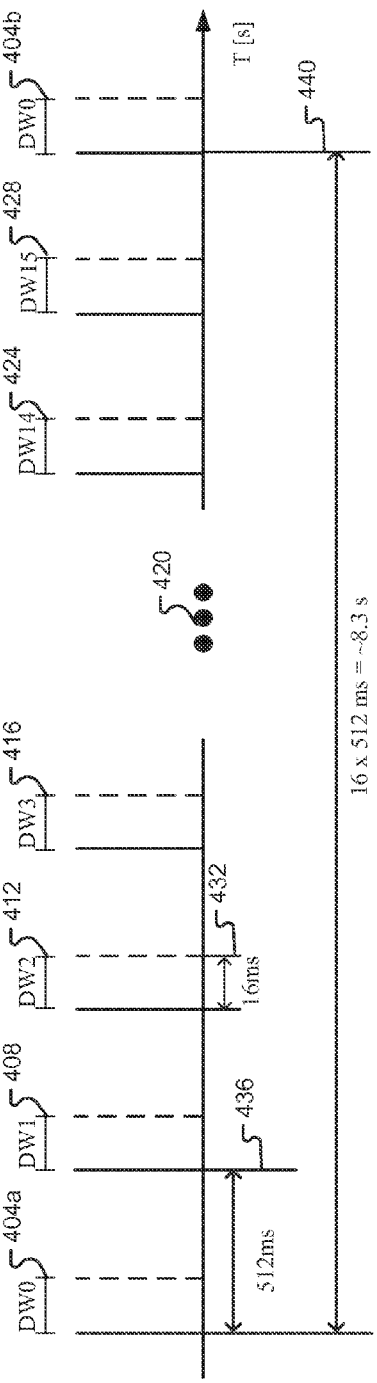

NAN DISCOVERY WINDOW SELECTION

TECHNICAL FIELD

Embodiments pertain to wireless networks. Some embodiments relate to wireless networks that operate in accordance with one of the Institute of Electrical and Electronics Engineers (IEEE) 802.11 standards including the IEEE 802.11-2012 standards. Some embodiments relate to Neighbor Awareness Networking (NAN) in accordance with the Wi-Fi Alliance® Wi-Fi NAN Technical Specification Version 0.0.

BACKGROUND

Telecommunication networks are a collection of nodes that are interconnected for the purpose of carrying communication data between terminals. Currently, various telecommunication networks exist which enable this type of communication. Examples of such networks include Wireless Local Area Networks (WLAN), Wide Area Networks (WAN), and most recently Neighbor Awareness Networks (NAN). Neighbor Awareness Networking is a network protocol developed by the Wi-Fi Alliance® for pre-associated service discovery. The purpose of the protocol is to synchronize Wi-Fi Stations (STA) in a STA to STA (S2S) environment such that STAs are able to discover and trigger connectivity and other interaction based on services published or subscribed to by the STA.

STAs eligible for this connectivity must be NAN enabled and can include devices such as mobile phones, access points, light switches, and other smart devices that are forming part of the internet of things. Connectivity occurs when one or more NAN devices transmit and/or receive synchronization frames, during discovery windows, from other NAN devices located within a NAN cluster. However, the current NAN protocol does not specify which of the discovery windows other than the first window, in which frame transmission should occur.

A number of issues arise from this scenario. For example, the first discovery window (DW0) only appears once approximately every 8.3 seconds; this leads to intervals that can be too large for some applications running on the NAN device. Too large of an interval can lead to a missed advertisement that was to be presented as a client neared a venue, a light switch which has an 8.3 second responsiveness delay, or other applications which would be degraded by a delayed responsiveness. These intervals would be unacceptable.

Also, if discovery windows are randomly selected by the device, two STAs could possibly not intersect or have a common window until DW0 repeats. By only having one designated common window, the MAC would become less efficient, as it would have to transmit possibly at every discovery window until a correlation is achieved. Therefore, it is with respect to these and other considerations that the present improvements have been developed.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an exemplary NAN device discovery timeline;

FIG. 4 illustrates an exemplary Discovery Window Distribution;

DESCRIPTION OF EMBODIMENTS

Figure 1:
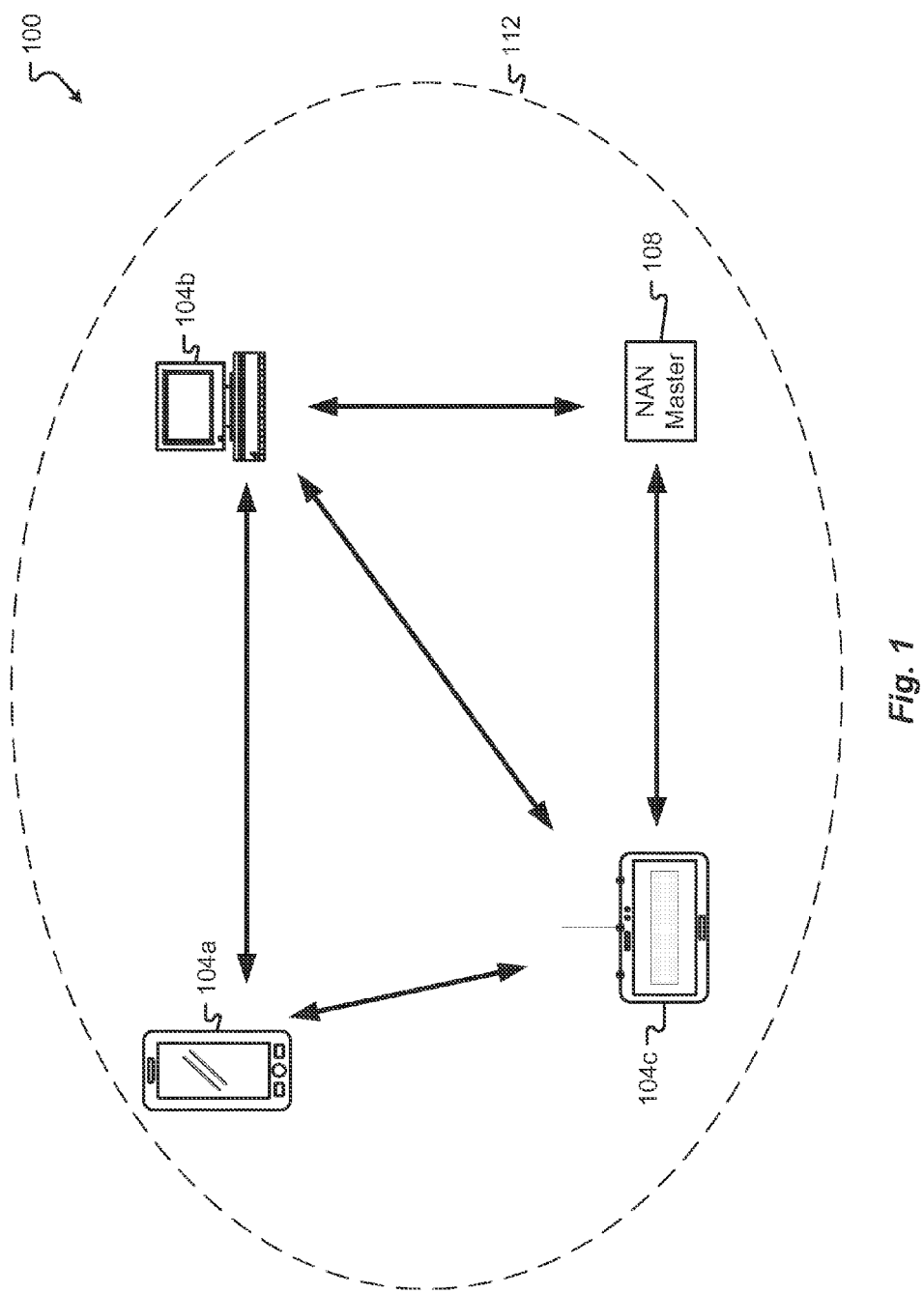
FIG. 1 illustrates an exemplary NAN communication environment.

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. Embodiments may also be implemented as Wi-Fi Alliance® Technical Specification for Wi-Fi Neighbor Awareness Networking (NAN) Version 0.0.

Embodiments may be implemented as part of the IEEE 802.11 standard. The IEEE 802.11 standard specifies a common Medium Access Control (MAC) Layer which provides a variety of functions that support the operation of 802.11-based wireless LANs (WLANs). The MAC Layer manages and maintains communications between 802.11 stations (such as between radio network cards (NIC) in a PC or other wireless devises or stations (STA) and access points (APs)) by coordinating access to a shared radio channel and utilizing protocols that enhance communications over a wireless medium. The embodiments described are not limited to 802.11 standards, NAN, or Hotspot 2.0 standards. Embodiments can also be used in implementation with other wireless communications standards and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however, that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a NAN cluster and/or the Internet, or within a dedicated secured, unsecured, and/or encrypted system and/or within a network operation or management device that is located inside or outside the network. As an example, a NAN device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a mobile device, a network operation or management device, a node or collocated on a particular node of a distributed network, such as a communications network.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, user interfaces, etc. The embodiments may relate to a communication device and/or communication system. The communication system can include Neighbor Awareness Networking. Neighbor Awareness Networking can include various devices communicating with one another within a NAN cluster. Communication between the devices occurs at transmission and/or reception of a frame during a common discovery window. The overall design and functionality of the system described herein is to provide a client with an adaptable means for increasing responsiveness between devices while still meeting the power requirements of the device.

Embodiments provide novel discovery window mechanisms that facilitate a faster and more efficient process for identifying and synchronizing between NAN devices. The embodiments alternatively or additionally provide a means for increasing the likelihood of sharing a common discovery window leading to a shorten average time interval to discovery. The embodiments alternatively or additionally provide a method for generally reducing the number of messages required to establish a connection, thus reducing the expected medium usage. The embodiments further alternatively or additionally, provide a way to enable communication with other NAN devices without the need to understand NAN MAC timing. As a result, one exemplary embodiment is faster device discovery which is more power efficient and is expandable to future responsiveness levels. Other advantages exist as well as will be discussed herein.

A NAN communication environment 100 that may communicate information between two or more devices is shown in FIG. 1. The NAN communication environment 100 can be a Neighbor Awareness Network (NAN) which includes a NAN cluster 112. The NAN cluster 112 is formed when NAN enabled devices 104, 108 communicate and share a common set of NAN parameters. The NAN enabled devices 104 can include devices such as, but not limited to, mobile communication devices 104a, hand-held wireless devices, stationary communication devices 104b, access points 104c, and other embedded computing devices that can be part of an Internet of Things (IoT) interconnection. The NAN enabled devices 104 can operate in a NAN Network alone or concurrently with other networks such as Bluetooth, WLAN, etc.

FIG. 1 further illustrates NAN enabled devices 104a-104c communicating within a NAN cluster 112. A NAN enabled device 104 can support Master and Non-master roles. A NAN master 108 is a communication device that is part of the NAN cluster 112. The NAN master 108 can be a NAN enabled device 104. All NAN enabled devices 104 are capable of being a cluster NAN master 108. A key difference in NAN enabled device 104 and a NAN master 108, is that the NAN master 108 transmits Synchronization, Service Discovery and Discovery Beacons frames. A NAN enabled device 104, not operating in a NAN master 108 state, will either only transmit service discovery frames or not transmit frames at all. Further details explaining beacon and service discovery frame transmission are discussed below and in conjunction with FIG. 3.

Figure 2:
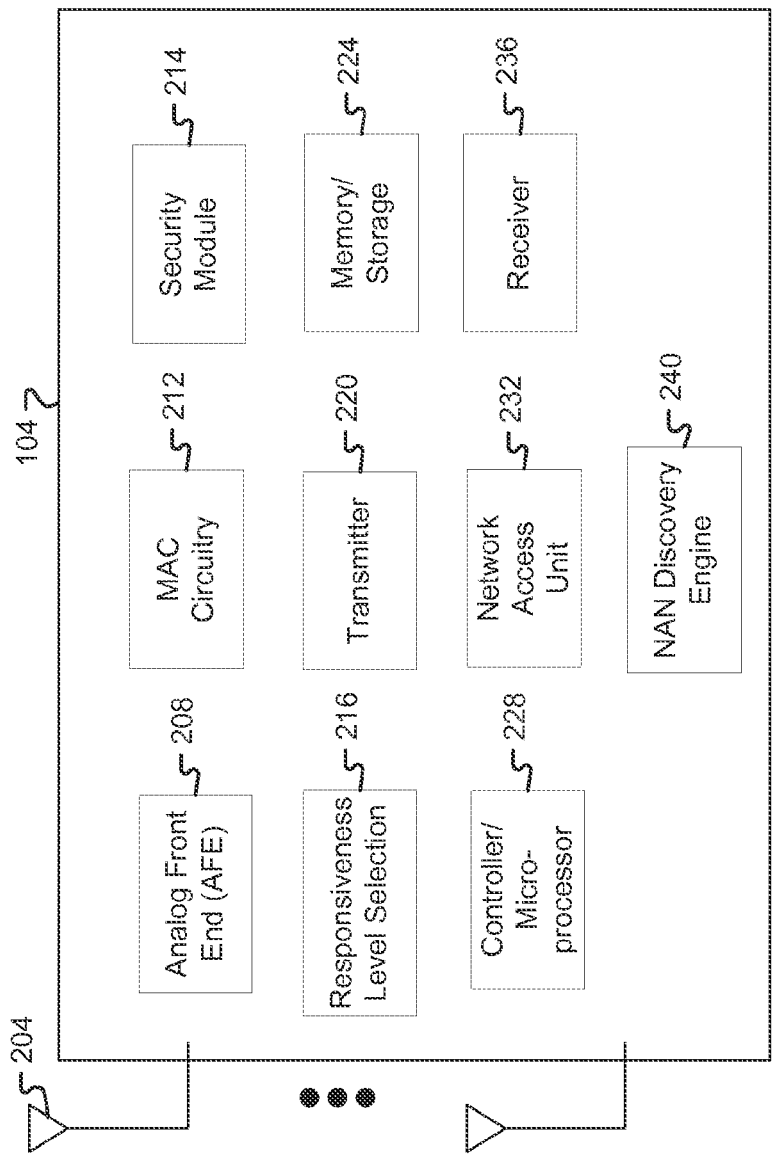
FIG. 2 illustrates an exemplary NAN device.

An example of a NAN device 104 architecture is shown in FIG. 2. The NAN device 104 may comprise hardware circuitry and/or software that conduct various operations. The operations can include, but are not limited to, conducting calls, synchronizing with other devices, opening multiple applications, presenting information through audio and/or video means, taking pictures, communicating with other NAN devices, etc. The NAN enabled device 104 can be any type of computing system operable to conduct any type of operation described here. As an example, the NAN enabled device 104 can be a mobile phone which includes and interacts with various modules and components 204-240 as shown in FIG. 2.

The NAN enabled device 104 can have one more antennas 204, for use in wireless communications such as multi-input multi-output (MIMO) communications, Bluetooth®, NAN, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which is needed to enable the correct processing of the received modulated signal. The AFE 208 can sit between the antenna and a digital baseband system in order to convert the analog signal into a digital signal for processing.

The NAN enabled device 104 can also include a controller/microprocessor 228 and a memory/storage 224. The NAN device 104 can interact with the memory/storage 224 which may store information and operations necessary for configuring and transmitting or receiving the message frames described herein. The memory/storage 224 may also be used in connection with the execution of application programming or instructions by the controller/microprocessor 228, and for temporary or long term storage of program instructions and/or data. As examples, the memory/storage 224 may comprise a computer-readable device, RAM, ROM, DRAM, SDRAM or other storage devices and media.

The controller/microprocessor 228 may comprise a general purpose programmable processor or controller for executing application programming or instructions related to the NAN enabled device 104. Further, controller/microprocessor 228 can perform operations for configuring and transmitting message frames as described herein. The controller/microprocessor 228 may include multiple processor cores, and/or implement multiple virtual processors. Optionally, the controller/microprocessor 228 may include multiple physical processors. By way of example, the controller/microprocessor 228 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The NAN enabled device 104 can further include a transmitter 220 and receiver 236 which can transmit and receive signals, respectively, to and from other NAN enabled devices 104 using one or more antennas, 204. Included in the NAN enable device 104 architecture is the medium access control or MAC Circuitry 212. MAC circuitry 212 provides the medium for controlling access to the wireless medium. The MAC circuitry 212 may be arranged to contend for a wireless medium and configure frames or packets for communicating over the wireless medium. In one example, NAN Beacon and Service Discovery frames can be processed by the MAC circuitry 212. In another example, the MAC circuitry 212 can assist with NAN synchronization either between NAN devices, within a cluster, or both.

The MAC circuitry 212 can work together or independently of a NAN discovery engine 240, which can aid in the discovery and communication with services and applications available. The NAN discovery engine 240 can work as an interface between the MAC circuitry 212 and applications and services available. As an example, the NAN discovery engine 240 can carry information useful for connectivity such as P2P operation attributes, NAN connection capability, etc.

Responsiveness level selection module 216 can also form part of the architecture of the NAN enabled device 104. The responsiveness level selection module 216 can be a module that performs the operations necessary for discovery window selection. Such operations can include, but are not limited to, discovery window subset generation, responsiveness level creation, power management determination, and proper responsiveness level preference selection. Further details on discovery window selection are discussed below and in conjunction with FIG. 5 and FIG. 6.

The NAN enabled device 104 can also contain a security module 214. This security module 214 can contain information regarding but not limited to, security parameters required to connect the NAN enabled device 104 to other NAN enabled devices 104 or other available networks, and can include WEP or WPA security access keys, network keys, etc.

The network access unit 232, is also part of the NAN device architecture and can be used for connectivity with the local area network. In one example, the connectivity can include synchronization between devices. In another example, connectivity can include device discovery. In yet another example, the network access unit 232 can work as a medium which provides support to the NAN enabled device 104 for communication with Hotspots. In still another example, the network access unit 232 can work in conjunction with at least the MAC circuitry 212. The network access unit 232 can also work and interact with one or more of the modules described herein.

The modules described and others known in the art can be used with the NAN enabled device 104 and can be configured to perform the operations described herein in conjunction with FIG. 1 and FIGS. 3-6.

Members of a NAN cluster 112 include NAN enabled devices 104 that share common attributes, including a NAN device discovery timeline 300 such as the one illustrated in FIG. 3. The NAN device discovery timeline 300 include a series of discovery windows 324a, 324b, which are the windows in a certain time and channel in which the NAN enabled devices 104 can join the NAN cluster 112. The discovery windows 324 span between discovery window beginning 316a, b and discovery window end 320a, b. The discovery windows 324a, 324b repeat every 512 milliseconds, i.e the discovery windows 324a, 324b have a time interval between windows 328 of 512 milliseconds. Alternatively, the time interval between discovery windows 328 can be more or less than 512 milliseconds. During the time interval between discovery windows 328, NAN devices 104 are able to sleep or communicate using other networks such as WLAN, Bluetooth, Hotspot, etc. Further details describing window timing and intervals are included below and in conjunction with FIG. 4.

In order to synchronize to a NAN cluster 112, NAN enabled devices 104 receive and/or transmit a series of beacon frames 304a, 304b, 304c, 308a, 308b, 312a and 312b. These beacon frames 304, 308, 312 are transmitted by other NAN devices such as, but not limited to, access points, NAN master devices, etc. Synchronization beacons frames 308a, 308b for example, are frames transmitted by at least one NAN enabled device 104 for synchronizing with a common clock within a NAN cluster 112. These frames can enable connectivity between NAN enabled devices 104 when received by other NAN enabled device 104 looking to join the NAN cluster 112. NAN enabled device 104 can also transmit NAN service discovery frames 312a, 312b as an indication that, that NAN enabled device 104 wishes to participate in the NAN cluster 112. Further, NAN service discovery frames 312a, 312b can also be transmitted to assist in connection post NAN discovery. If a NAN enabled device 104 wishes to join a NAN cluster 112, but misses the synchronization beacon frames 308, the NAN enabled device 104 can still do so without having to wait for a new discovery window 324 that is sending the synchronization beacon frames 308. Instead, the device can use NAN discovery beacon frames 304a, 304b, 304 sent by the NAN master 108. These frames can only be sent by a NAN master and are generally transmitted during the interval between discovery windows 328. As mentioned above and in conjunction with FIG. 1, the NAN master 104 is the only device capable of transmitting synchronization beacon frames 308, service discovery frames 312 and discovery beacon frames 304.

An exemplary embodiment of a discovery window distribution 400 is presented in FIG. 4. In a NAN system, discovery windows 404-428 are generally transmitted in sets of 16 repeating windows. These windows can be designated discovery window 0 (DW0) 404a, discovery window 1 (DW1) 408, discovery window 2 (DW2) 412, discovery window 3 (DW3) 416, discovery window 14 (DW14) 424, and discovery window 15 (DW15) 428, with intermediate windows ranging from DW4 to DW13 represented by ellipses 420. The window sets repeat and begin back at discovery window 404, with the repeated window designated DW0 404b. This repetition is illustrated in FIG. 4 with DW0 404a repeating as DW0 404b, after DW15 428 (i.e. after 16 windows).

Time and spacing between discovery windows can be specified by the protocol. Additionally or alternatively, time interval between windows, time interval of an entire sequence and/or transmission time of one discovery window may be varied. Additionally, or alternatively, the number of windows in a sequence can also be specified by the protocol, set by a user and/or vary in time and channel. This can be possible if changes to the time interval, duration, cluster parameters, and/or other special variable behavior are pre-defined if not pre-specified by the protocol.

In one exemplary example, each discovery window time interval 432 is about 16 milliseconds long and the time interval 436 between the beginning of a first window and the beginning of the second window is about 512 milliseconds. Thus, sixteen discovery windows (DW0 404 to DW14 428) at 16 milliseconds long 432 each, yields a discovery window sequence time interval 440 that is approximately 8.3 seconds long.

As previously explained, it is during these discovery windows that NAN enabled devices 104 are synchronized or services discovered. Therefore, it is mandated by the NAN protocol that all Wi-Fi Stations (STA) or NAN enabled devices 104 within a cluster receive DW0 404 so that there is at least one instance when two NAN enabled devices 104 can communicate. However, beyond DW0 404, NAN enabled devices 104 can decide to transmit and/or receive frames on any of the remaining discovery windows 404-428 without agreement and/or behavior by which the NAN enabled device 104 can indicate which additional discovery window it will transmit on. Therefore, it is one embodiment of present disclosure to maximize the likelihood that two independent NAN enabled devices 104 share the same DW by introducing discovery window sets that NAN enabled devices 104 can select from.

Figure 5:
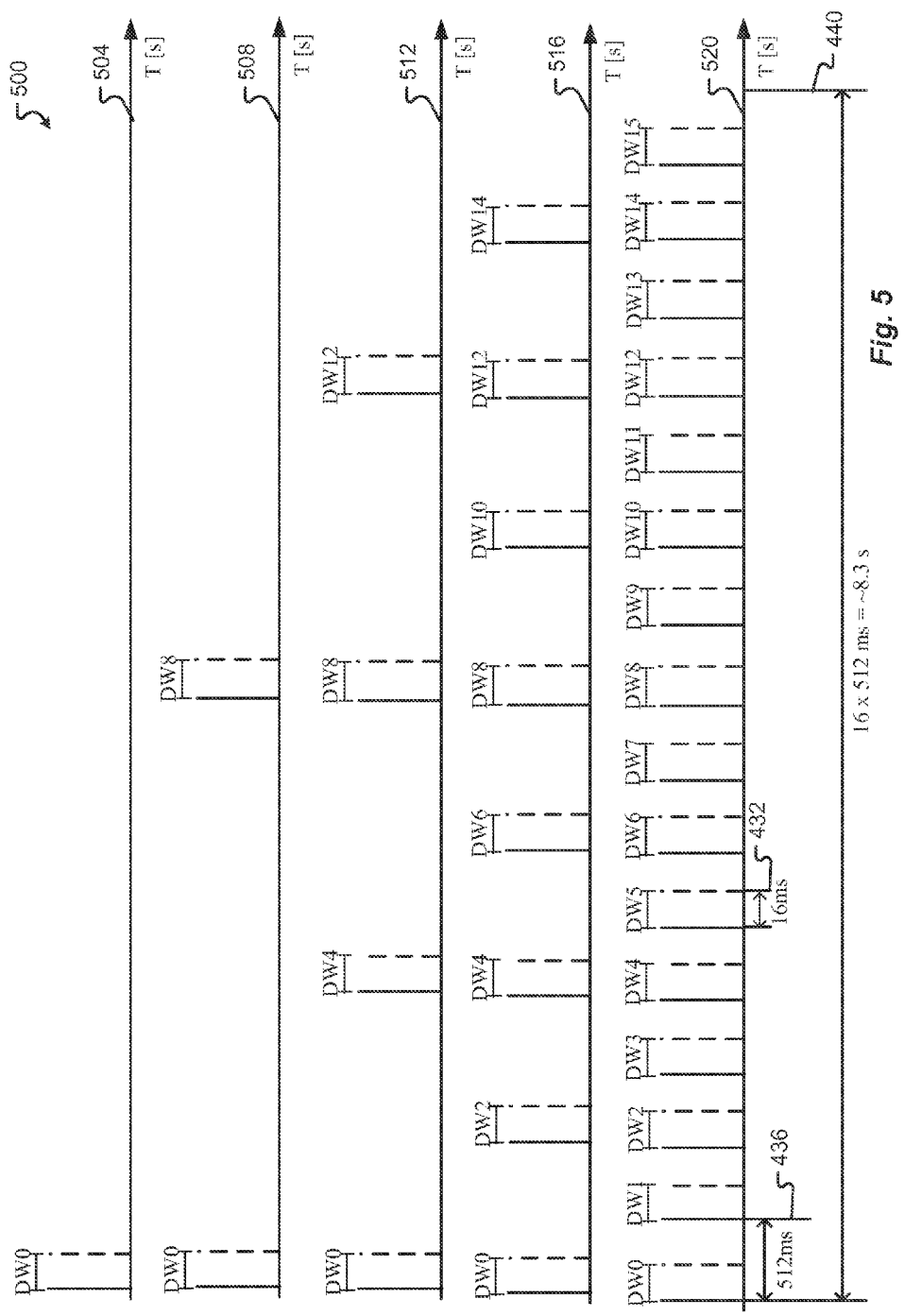
FIG. 5 illustrates an exemplary Discovery Window Subset Allocation.

These sets can form part of the discovery window subset allocation 500 as exemplified in FIG. 5. By introducing a discovery window subset allocation 500, MAC efficiency is improved. That is to say, if a set inclusion relationship exists between two devices, then there is a decrease in the number of messages required to establish connection and/or discovery. For example, in the current protocol, there is no designation as to what discovery windows the frames are transmitting on other than DW0. Therefore, the NAN enabled device 104 would require a new message at each window until it identifies a window that the other NAN enabled device 104 in the NAN cluster 112 is currently transmitting and/or receiving at.

To obviate this problem, the NAN enabled device 104 is locally presented with a discovery window set from which it can select. The subset is based on the following criteria:
1. For any two sets A & B, A is a proper subset of B or B is a proper subset of A, i.e:

$A \subseteq B$ $B \subseteq A$

2. The allowed set within the group has a uniform interval between any two DWs, and $DW\# \bmod 2^{\#of\ sets-RL} = 0$ An example of subsets which include the second criteria with elements ranging from 0 to 15 can include the following: {0}, {0,8}, {0, 4, 8, 12}, {0, 2, 4, 6, 8, 10, 12, 14}, and {0, 1, 2, 3, 4, 5, 6, 7, 8, 9, 10, 11, 12, 13, 14, 15}. This relationship is presented in FIG. 5 in the form of discovery windows with each subset designated a different responsiveness level. Therefore, subset {0} or equivalently {DW0} is designated responsiveness level 0 504. Similarly, responsiveness level 1 508 includes {DW0, DW8}, responsiveness level 2 512 includes {DW0, DW4, DW8, DW12}, responsiveness level 3 516 includes {DW0, DW2, DW4, DW6, DW8, DW10, DW12, DW14} and responsiveness level 4 includes {DW0 . . . DW15}. In addition, the time interval between repeating discovery windows 440 remains the same, at approximately 8.3 ms, the discovery window time interval 432 is 16 ms long and the time between the beginning of two consecutive windows 436 in a set with all 16 discovery windows remains at 512 ms. The NAN enabled device 104 selects the discovery window set or corresponding responsiveness level that best meets its needs. For example, a NAN enabled device 104 with a low power level can select a lower responsiveness level over a different NAN device 104 that is fully powered and can select a higher responsiveness level. In addition, responsiveness levels can also be selected based on the application it is trying to support. For example, a device with a light switch application would be more likely to have a higher responsiveness level over a client who simply needs to set the thermostat upon arrival at the home. Thus, responsiveness levels can power level based, application based, and/or a combination of those or other constraints.

By using a discovery window subset allocation 500 such as the one illustrated in FIG. 5, NAN enabled devices 104 can provide their own power level preference which the MAC Circuitry 212 can map to the corresponding responsiveness level (RL) meeting power limitations and assuring that the NAN enabled device 104 is able to discover other NAN enabled devices 104 within the NAN cluster 112.

In one example where a first and a second NAN enabled device select from the same discovery window set, the first NAN enabled device can select RL 2 512, while a second NAN enabled device selects RL 1 508. If the first NAN enabled device wishes to communicate with a second NAN enabled device, it can send NAN service discovery frames 312 during {DW0, DW4, DW8, DW12}. A second NAN device being part RL 1 508 will then have the opportunity to receive the frames transmitted during {DW0, DW8}. Again, unlike the current NAN protocol in which the NAN enabled device 104 can send a message up to 15 times before being received, the first NAN enabled device 104 only has to send 2 messages outside the required DW0 before synchronizing with a second NAN enabled device in the NAN cluster 112. The introduction of the subset, therefore, greatly reduced MAC processing minimizing the number of messages that need to be transmitted needed when every discovery window had to be considered.

Figure 6:
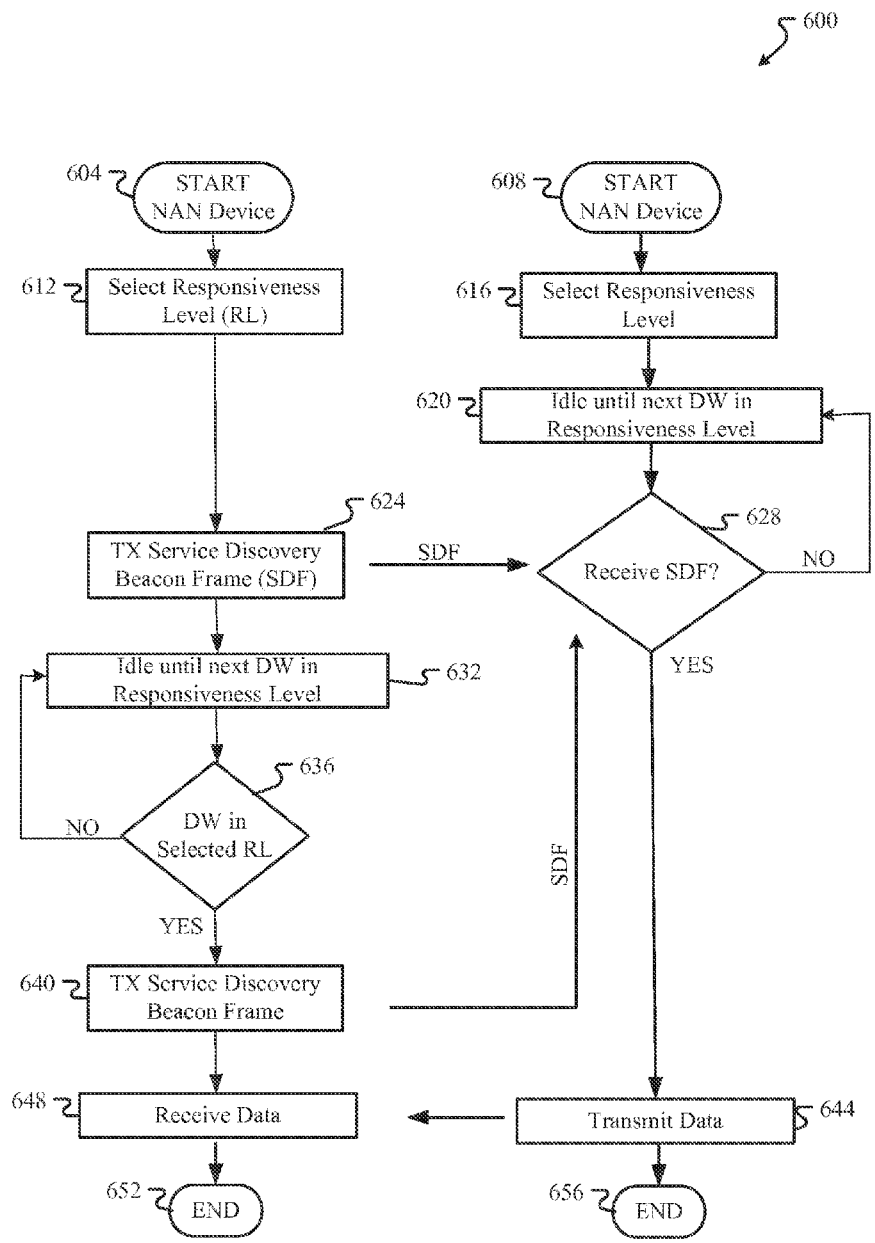
FIG. 6 illustrates flowchart illustrating NAN device communication using Discovery Window Subset Allocation.

FIG. 6 outlines an exemplary methodology that outlines NAN enabled device communication using discovery window subset allocation. The methodology begins with a start operation 604, 608 from two independent NAN enabled devices 104, a first NAN enabled device and a second NAN enabled device respectively. Each of the NAN enabled devices 104 continue to step 612, 616, where a responsiveness level, based on one or more of device power level and constraints is locally selected. The responsiveness level selected is a member of discovery window set similar to that presented above and in conjunction with FIG. 5, wherein the first NAN enabled device discovery window subset is a proper subset of the second NAN enabled device discovery window subset or vice versa. The process continues to step 624, where the first NAN enabled device 104 transmits a service discovery beacon frame 312, as explained above and in conjunction with FIG. 3. In one example, a service discovery beacon frame 312 is transmitted during DW0. In another embodiment, the service discovery beacon frame 312 is transmitted during at least one of the 15 other discovery windows available.

Concurrently, the second NAN enabled device after having selected the appropriate RL in step 616, remains idle in step 620 until it is time to wake for one of its discovery windows in its selected responsiveness level discovery window subset. Once awake, the second NAN enabled device looks to discover a service discovery beacon frame 312 sent by the first NAN enabled device in step 628. Alternatively or in addition, the second NAN enabled device can also transmit NAN synchronization beacon frames 308 as described above and in conjunction with FIG. 3. If, the second NAN enabled device fails to receive the service discovery beacon frame 312, then the second NAN enable device will return to step 620 where it will continue to idle until the next DW in its RL selected. Alternatively, if the a service discovery beacon frame 312 is received, then the second NAN enabled device will move forward in the process to step 644 where it will begin communicating with the first NAN enabled device.

Back at step 624, once the first NAN enabled device has transmitted the service discovery beacon frame 312, in step 632, the device will idle until the next DW in its responsiveness level. The first NAN enabled device is only transmitting and/or receiving frames during the discovery windows within its subset. Therefore, if sufficient time has passed (i.e. 512 ms), such that a new discovery window beginning is reached, then the first NAN enabled device must determine if the window reached is a member of the subset in step 636. To determine if the window is a member of the subset, the criteria explained above and in conjunction with FIG. 5 must be met. That is, the NAN enabled device will visit windows for which the following is met: DW# mod $2^{\#of\ sets-RL}=0$, where DW# is the window number and # of sets equal the square root of the discovery windows in a cycle. If, the current discovery window does not lie in the subset selected, the process returns to idle in step 632. Alternatively, if the current discovery window is a member of the subset, then the first NAN enabled device proceeds to step 640, where the device will transmit the service discovery beacon frame 312. The frame reaches step 628 in the second NAN enabled device, as previously indicated, if the service discovery beacon frame 312 is received, the second NAN enabled device moves forward to step 644. At step 644, the second NAN enabled device will transmit data and commence communicating with the first NAN enabled device. The first NAN enabled device receives the data transmitted at step 648. Steps 652 and 656 end the process for both the first NAN enabled device and the second NAN enabled device respectively.

The method 600, described herein can have more or fewer steps and can be arranged in steps differently than those shown in FIG. 6. The method 600 can also be executed as a set of computer-executable instructions executed on a computer system or processor and encoded or stored on a computer medium. The method 600 is described above and in conjunction with FIGS. 1-5.

Current embodiments provide solutions that remove the cost associated with no correlation type frame transmission and discovery window selection. In one embodiment, a technique for providing a subset of windows are proper subsets of each other is presented. In another embodiment, discovery window sets with set inclusion is described. Still in another embodiment, responsiveness level selection is presented. Still yet in another embodiment, a device is presented which selects the visited discovery window subsets independently of other NAN devices is explained.

Embodiments are thus directed toward a communication device for transmitting frames, comprising: a responsiveness level module, the responsiveness level module configured to: create a plurality of window subsets from a set of windows, wherein any two window subsets of the plurality of window subsets are governed by set inclusion; and select one of the plurality of window subsets for transmission of service discovery frames on the windows within the selected window subset; and a transceiver, the transceiver configured to transmit the service discovery frames on the windows within the selected window subset. Aspects of the above communication device include wherein the any two window subsets governed by set inclusion include a first window subset and a second window subset, wherein the first window subset is a proper subset of the second window subset, or wherein the second window subset is the proper subset of the first window subset. Aspects of the above communication device include wherein the window subsets have a uniform time interval between any two of the windows. Aspects of the above communication device include wherein the window subsets are specified within a specification and the communication device selects one of the window subsets specified within the specification for transmission of the service discovery frames. Aspects of the above communication device include wherein the window subsets follow modulo 2 arithmetic, wherein the windows in the window subsets are discovery windows (DWs), and wherein the discovery windows in the window subsets include at least one of DW0, DW4, DW8, and DW12. Aspects of the above communication device include wherein selecting the window subset corresponds to a responsiveness level selection, wherein the responsiveness level selection is based on a responsiveness preference determined by one or more of an application and a power level of the communication device. Aspects of the above communication device include wherein the responsiveness level selection is chosen by a MAC (Medium Access Control) which aggregates and selects a responsiveness level that yields a preferred responsiveness. Aspects of the above communication device include wherein the service discovery frames assist in the communication device discovery and connection. Aspects of the above communication device include wherein the service discovery frames are transmitted when a modulo arithmetic between a window subset value and a powered value equal zero, wherein the powered value is a function of the windows in a cycle. Aspects of the above communication device include wherein the communication device is Neighbor Awareness Networking (NAN) enabled.

Embodiments include a method for transmitting frames, the method comprising: obtaining, by a transceiver, from a network a time and channel information identifying a set of windows available for communication; creating, by a responsiveness level module, a plurality of window subsets from the set of windows, wherein any two window subsets within the plurality of window subsets, are governed by set inclusion; selecting, by the responsiveness level module, one of the plurality of window subsets for transmission of service discovery frames; and transmitting, by the transceiver, the service discovery frames on the windows within the selected window subset. Aspects of the above method include wherein the any two window subsets governed by set inclusion include a first window subset and a second window subset, wherein the first window subset is a proper subset of the second window subset, or wherein the second window subset is the proper subset of the first window subset. Aspects of the above method include wherein the window subsets have a uniform time interval between any two of the windows. Aspects of the above method include wherein the window subsets are pre-defined and a device can select from the pre-defined window subsets. Aspects of the above method include wherein the window subsets are specified within a specification and the communication device selects one of the window subsets specified within the specification for transmission of the service discovery frames. Aspects of the above method include wherein the window subsets follow modulo 2 arithmetic, wherein the windows in the window subsets are discovery windows (DWs), and wherein the discovery windows in the window subset include at least one of DW0, DW4, DW8, and DW12. Aspects of the above method include wherein selecting the window subset corresponds to a responsiveness level selection, wherein responsiveness level selection is based on a responsiveness preference determined by at least one of a plurality of applications and a power level of the transceiver. Aspects of the above method include wherein the responsiveness preference is indicated by a time interval or a responsiveness level. Aspects of the above method include wherein the responsiveness level selection is chosen by a MAC (Medium Access Control) which aggregates and selects the responsiveness level that yields a preferred responsiveness. Aspects of the above method include wherein the responsiveness level selection is at least partly based on responsiveness level requests generated by the at least one of a plurality of applications at a higher layer and by an operating system. Aspects of the above method include wherein the preferred responsiveness is measured by the ability of the device to meet the power level of the transceiver and assure connectivity with another device. Aspects of the above method include wherein the at least one of a plurality of applications is an object in an internet of things. Aspects of the above method include wherein the service discovery frames assist in the device discovery and connection. Aspects of the above method include wherein the service discovery frames are transmitted when a modulo arithmetic between a window subset value and a powered value equal zero, wherein the powered value is a function of the windows in a cycle. Aspects of the above method include wherein the device is Neighbor Awareness Networking (NAN) enabled.

Embodiments include a non-transitory computer readable medium having instructions stored thereon that when executed by at least one processor of a communication device perform a method comprising: obtaining, by a transceiver, from a network a time and channel information identifying a set of windows available for communication; creating, by a responsiveness level module, a plurality of window subsets from the set of windows, wherein any two window subsets of the plurality of window subsets, are governed by set inclusion; selecting, by the responsiveness level module, one of the plurality of window subsets for transmission of service discovery frames; and transmitting, by the transceiver, the service discovery frames on the windows within the selected window subset. Aspects of the above media include wherein the any two window subsets governed by set inclusion include a first window subset and a second window subset, wherein the first window subset is a proper subset of the second window subset, or wherein the second window subset is the proper subset of the first window subset. Aspects of the above media include wherein the window subsets have a uniform time interval between any two of the windows. Aspects of the above media include wherein the window subsets follow modulo 2 arithmetic, wherein the windows in the window subsets are discovery windows (DWs), and wherein the discovery windows in the window subset include at least one of DW0, DW4, DW8, and DW12. Aspects of the above media include wherein selecting the window subset corresponds to a responsiveness level selection, wherein responsiveness level selection is based on a responsiveness preference determined by one or more of an application and power level of the communication device. Aspects of the above media include wherein the responsiveness level selection is chosen by a MAC (Medium Access Control) which aggregates and selects the responsiveness level that yields a preferred responsiveness. Aspects of the above media include wherein the preferred responsiveness is measured by the ability of the communication device to meet the power level of the communication device and assure connectivity with another communication device. Aspects of the above media include wherein the service discovery frames assist in the communication device discovery and connection. Aspects of the above media include wherein the service discovery frames are transmitted when a modulo arithmetic between a window subset value and a powered value equal zero, wherein the powered value is a function of the windows in a cycle. Aspects of the above media include wherein the communication device is Neighbor Awareness Networking (NAN) enabled.

Embodiments include a system for transmitting frames, comprising: means for, obtaining from a network, time and channel information identifying a set of windows available for communication; means for creating a plurality of window subsets from the set of windows, wherein any two window subsets of the plurality of window subsets, are governed by set inclusion; means for selecting one of the plurality of window subsets for transmission of service discovery frames; and means for transmitting the service discovery frames on the windows within the selected window subset. Aspects of the above system include wherein the any two window subsets governed by set inclusion include a first window subset and a second window subset, wherein the first window subset is a proper subset of the second window subset, or wherein the second window subset is the proper subset of the first window subset. Aspects of the above system include wherein the window subsets have a uniform time interval between any two of the windows. Aspects of the above system include wherein the window subsets are pre-defined and the system can select from the pre-defined window subsets. Aspects of the above system include wherein the window subsets follow modulo 2 arithmetic, wherein the windows in the window subsets are discovery windows (DWs), and wherein the discovery windows in the window subset include at least one of DW0, DW4, DW8, and DW12. Aspects of the above system include wherein selecting the window subset corresponds to a responsiveness level selection, wherein responsiveness level selection is based on a responsiveness preference determined by one or more of an application and power level of the transceiver. Aspects of the above system include wherein the responsiveness preference is indicated by a time interval or a responsiveness level. Aspects of the above system include wherein the service discovery frames assist in a communication device discovery and connection. Aspects of the above system include wherein the service discovery frames are transmitted when a modulo arithmetic between a window subset value and a powered value equal zero, wherein the powered value is a function of the windows in a cycle. Aspects of the above system wherein the communication device is Neighbor Awareness Networking (NAN) enabled. Aspects of the above system include wherein the communication device selects the window subset independent of other communication devices in a NAN network.

Embodiments include a communication device for transmitting frames, comprising: a responsiveness level module, the responsiveness level module configured to: create a plurality of window subsets from a set of windows, wherein any two window subsets of the plurality of window subsets are governed by set inclusion, wherein the window subsets within the set of windows are pre-defined; and select one of the plurality of window subsets for transmission of service discovery frames on the windows within the selected window subset; and a transceiver, the transceiver configured to transmit the service discovery frames on the windows within the selected window subset. Aspects of the above communication device include wherein the any two window subsets governed by set inclusion include a first window subset and a second window subset, wherein the first window subset is a proper subset of the second window subset, or wherein the second window subset is the proper subset of the first window subset.

The exemplary embodiments are described in relation to Neighbor Awareness Networking. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to IEEE 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for discovery window selection based on NAN technologies. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A communication device, comprising:
a receiver that receives a discovery window set, the discovery window set including a plurality of window subsets created from a set of windows, wherein any two window subsets of any of the created plurality of window subsets are governed by a set inclusion relationship; and
a responsiveness level module, the responsiveness level module configured to select one of the plurality of window subsets, from the received discovery window set, that are governed by the set inclusion relationship for transmission of service discovery frames on the windows within the selected window subset, the selected one of the plurality of window subsets corresponding to a power level preference; and
a transceiver, the transceiver in communication with the responsiveness level module and configured to transmit the service discovery frames on the windows within the selected window subset.

2. The communication device of claim 1, wherein the any two window subsets governed by set inclusion include a first window subset and a second window subset, wherein the first window subset is a subset of the second window subset, or wherein the second window subset is the subset of the first window subset.

3. The communication device of claim 1, wherein the window subsets have a uniform time interval between any two of the windows.

4. The communication device of claim 2, wherein the window subsets are specified within a specification and the communication device selects one of the window subsets specified within the specification for transmission of the service discovery frames.

5. The communication device of claim 2, wherein the window subsets follow modulo 2 arithmetic, wherein the windows in the window subsets are discovery windows (DWs), and wherein the discovery windows in the window subsets include at least one of DW0, DW4, DW8, and DW12.

6. The communication device of claim 1, wherein selecting the window subset corresponds to a responsiveness level selection, wherein the responsiveness level selection is based on a responsiveness preference determined by one or more of an application and a power level of the communication device, and wherein the responsiveness level selection is chosen by a MAC (Medium Access Control) which aggregates and selects a responsiveness level that yields a preferred responsiveness.

7. A method comprising:
obtaining, by a transceiver, from a network time and channel information identifying a set of windows available for communication;
receiving, by a receiver, a discovery window set, the discovery window set including a plurality of window subsets created from the set of windows, wherein any two window subsets of any of the created plurality of window subsets are governed by a set inclusion relationship;
selecting, by a responsiveness level module, one of the plurality of window subsets, from the received discovery window set, that are governed by the set inclusion relationship for transmission of service discovery frames, the selected one of the plurality of window subsets corresponding to a power level preference; and
transmitting, by the transceiver, the service discovery frames on the windows within the selected window subset.

8. The method of claim 7, wherein the any two window subsets governed by set inclusion include a first window subset and a second window subset, wherein the first window subset is a subset of the second window subset, or wherein the second window subset is the subset of the first window subset.

9. The method of claim 7, wherein the window subsets have a uniform time interval between any two of the windows.

10. The method of claim 8, wherein the window subsets are specified within a specification and the communication device selects one of the window subsets specified within the specification for transmission of the service discovery frames.

11. The method of claim 7, wherein the window subsets are pre-defined and a device can select from the pre-defined window subsets.

12. The method of claim 9, wherein the window subsets follow modulo 2 arithmetic, wherein the windows in the window subsets are discovery windows (DWs), and wherein the discovery windows in the window subset include at least one of DW0, DW4, DW8, and DW12.

13. The method of claim 7, wherein selecting the window subset corresponds to a responsiveness level selection, wherein responsiveness level selection is based on a responsiveness preference determined by at least one of a plurality of applications and a power level of the transceiver.

14. The method of claim 13, wherein the responsiveness preference is indicated by a time interval or a responsiveness level, and wherein the responsiveness level selection is chosen by a MAC (Medium Access Control) which aggregates and selects the responsiveness level that yields a preferred responsiveness.

15. The method of claim 14, wherein the responsiveness level selection is at least partly based on responsiveness level requests generated by the at least one of a plurality of applications at a higher layer and by an operating system.

16. The method of claim 14, wherein the preferred responsiveness is measured by the ability of the device to meet the power level of the transceiver and assure connectivity with another device.

17. The method of claim 7, wherein the service discovery frames are transmitted when a relationship between a window subset value and a powered value are equal to zero, wherein the powered value is a function of the windows in a cycle.

18. The method of claim 7, wherein the device is Neighbor Awareness Networking (NAN) enabled, and wherein the at least of a plurality of applications is an object in an internet of things.

19. A non-transitory computer readable information storage medium having instructions stored thereon that when executed by at least one processor of a communication device perform a method comprising:
obtaining, by a transceiver, from a network a time and channel information identifying a set of windows available for communication;
receiving, by a receiver, a discovery window set, the discovery window set including a plurality of window subsets created from the set of windows, wherein any two window subsets of any of the plurality of created window subsets are governed by a set inclusion relationship;
selecting, by a responsiveness level module, one of the plurality of window subsets, from the received discovery window set, that are governed by the set inclusion relationship for transmission of service discovery frames, the selected one of the plurality of window subsets corresponding to a power level preference; and
transmitting, by the transceiver, the service discovery frames on the windows within the selected window subset.

20. The non-transitory medium of claim 19, wherein the any two window subsets governed by set inclusion include a first window subset and a second window subset, wherein the first window subset is a subset of the second window subset, or wherein the second window subset is the subset of the first window subset.

21. The non-transitory medium of claim 19, wherein the window subsets follow modulo 2 arithmetic, wherein the windows in the window subsets are discovery windows (DWs), and wherein the discovery windows in the window subset include at least one of DW0, DW4, DW8, and DW12.

22. The non-transitory medium of claim 19, wherein selecting the window subset corresponds to a responsiveness level selection, wherein responsiveness level selection is based on a responsiveness preference determined by one or more of an application and power level of the communication device, and wherein the responsiveness level selection is chosen by a MAC (Medium Access Control) which aggregates and selects the responsiveness level that yields a preferred responsiveness.

23. The non-transitory medium of claim 22, wherein the preferred responsiveness is measured by the ability of the communication device to meet the power level of the communication device and assure connectivity with another communication device.

24. A communication device, comprising:
a responsiveness level module, the responsiveness level module configured to:
create a plurality of window subsets from a set of windows, wherein any two window subsets of any of the created plurality of window subsets are governed by a set inclusion relationship, wherein the window subsets within the set of windows are pre-defined; and
select one of the plurality of window subsets that are governed by the set inclusion relationship for transmission of service discovery frames on the windows within the selected window subset, the selected one of the plurality of window subsets corresponding to a power level preference; and a transceiver, the transceiver configured to transmit the service discovery frames on the windows within the selected window subset.

25. The communication device of claim 24, wherein the any two window subsets governed by set inclusion include a first window subset and a second window subset, wherein the first window subset is a subset of the second window subset, or wherein the second window subset is the subset of the first window subset.

* * * * *